(12) United States Patent
Espinasse (10) Patent No.: US 11,242,037 B2
(45) Date of Patent: Feb. 8, 2022

(54) ELEMENT FOR A SYSTEM FOR CONNECTING A WINDSCREEN WIPER BLADE HOLDER TO A DRIVE ARM

(71) Applicant: Valeo Systèmes d'Essuyage, Le Mesnil Saint Denis (FR)

(72) Inventor: Philippe Espinasse, Coudes (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 377 days.

(21) Appl. No.: 15/348,206

(22) Filed: Nov. 10, 2016

(65) Prior Publication Data

US 2017/0136997 A1 May 18, 2017

(30) Foreign Application Priority Data

Nov. 13, 2015 (FR) ...................................... 1560915

(51) Int. Cl.
*B60S 1/40* (2006.01)
*B60S 1/38* (2006.01)
(Continued)

(52) U.S. Cl.
CPC ............... *B60S 1/40* (2013.01); *B60S 1/0441* (2013.01); *B60S 1/3495* (2013.01);
(Continued)

(58) Field of Classification Search
CPC .... B60S 1/3849; B60S 1/3851; B60S 1/3853; B60S 1/3865; B60S 1/3868; B60S 1/3858;
(Continued)

(56) References Cited

U.S. PATENT DOCUMENTS

| | | | |
|---|---|---|---|
| 2008/0092320 A1 | 4/2008 | Cempura et al. | |
| 2014/0201938 A1* | 7/2014 | Park .......................... | B60S 1/38 15/250.48 |

FOREIGN PATENT DOCUMENTS

| | | |
|---|---|---|
| DE | 10100847 A1 | 7/2002 |
| DE | 102010003372 A1 | 9/2011 |

(Continued)

OTHER PUBLICATIONS

Preliminary Search Report issued in corresponding French Application No. 1560915, dated Jul. 4, 2016 (6 pages).

*Primary Examiner* — Katina N. Henson
(74) *Attorney, Agent, or Firm* — Osha Bergman Watanabe & Burton LLP (57) ABSTRACT

Element (24, 26) for a system for connecting a windscreen wiper blade holder to a drive arm, said element (24, 26) being designed to be rigidly connected to said blade holder or to said arm and including rotation means (80a, 80b; 60b, 60a) designed to cooperate with complementary means (60a, 60b; 80b, 80a) of another element (26, 24) of the connection system to form an axis of rotation between the element (24, 26) and the second element (26, 24), said axis of rotation being designed to be the axis of rotation between said blade holder and said arm, characterized in that said means of rotation (80a, 80b; 60b, 60a) include a protuberance (80a, 60b), which is arranged on one side of the longitudinal mid-plane (P) of said element (24, 26) and is able to cooperate with a cavity (60a, 80b) in the other element (26, 24), and a cavity (80b, 60a), which is arranged on the other side of said plane (P) and is able to cooperate with a protuberance (60b, 80a) on the other element (26, 24), the element (24, 26) being asymmetrical in relation to said plane (P).

18 Claims, 6 Drawing Sheets

(51) Int. Cl.
*B60S 1/04* (2006.01)
*B60S 1/34* (2006.01)

(52) U.S. Cl.
CPC ........... *B60S 1/3853* (2013.01); *B60S 1/3865* (2013.01); *B60S 1/4048* (2013.01); *B60S 2001/4051* (2013.01); *B60S 2001/4054* (2013.01)

(58) Field of Classification Search
CPC ........ B60S 1/40; B60S 1/4038; B60S 1/4045; B60S 1/4048; B60S 2001/4051; B60S 2001/4054; B60S 2001/4077; B60S 2001/4009; B60S 2001/4003; Y10T 403/32861; Y10T 403/15; Y10T 403/32877; Y10T 403/32918; Y10T 403/32934
USPC .............................. 15/250.32, 250.43, 250.44
See application file for complete search history.

(56) References Cited

FOREIGN PATENT DOCUMENTS

| | | | | |
|---|---|---|---|---|
| DE | 102010030880 | A1 | | 1/2012 |
| EP | 2557002 | A1 * | 2/2013 | ............. B60S 1/387 |
| EP | 2813404 | A2 | | 12/2014 |
| JP | 200575050 | A * | 3/2005 | |

* cited by examiner

ELEMENT FOR A SYSTEM FOR CONNECTING A WINDSCREEN WIPER BLADE HOLDER TO A DRIVE ARM

TECHNICAL DOMAIN

The present invention relates in particular to an element for a system for connecting a windscreen wiper blade holder to a drive arm.

PRIOR ART

A motor car is conventionally fitted with windscreen wipers to wash the windscreen and to ensure that the driver's view of the surrounding environment is not disturbed. These windscreen wipers usually comprise a drive arm performing an angular to-and-fro movement, and elongated blade holders carrying wiper blades made of an elastic material. These blades rub against the windscreen and move the water out of the driver's field of vision. In a conventional version, these blade holders are articulated clamps that hold the wiper blade at several different points, enabling same to bend to fit the curve of the windscreen. In a more recent version, referred to as "flat blade", they comprise a semi-rigid assembly that holds the wiper blades along the entire length of same using one or more bending joints enabling the blade holder to be applied to the windscreen without having to use clamps.

In both solutions, the blade holder is attached to the drive arm by a connection system including a connector and an adaptor. The connector is an element that is rigidly connected to the blade holder and that is usually attached directly to the wiper blade or to the flat blade, while the adaptor is an element rigidly connected to the arm. The adaptor is an intermediate part that enables the linking and attachment of the connector to the drive arm. This is usually designed to be engaged in a head or end part of the drive arm in the form of a clevis with a U-shaped cross-section.

The connector and the adaptor each have jointing means designed to cooperate with complementary means on the other element in order to form at least one transverse axis of rotation between the connector and the adaptor, which is an axis of rotation between the blade holder and the arm. In the prior art, one of the elements, such as the connector, usually includes a substantially cylindrical physical shaft that forms the fulcrum and that is received in a seat of matching shape in the other element.

The adaptor usually has a body designed to be engaged in the end part of the arm such that this body extends at least partially between the two substantially parallel lateral legs of the end part. The body of the adaptor is linked at one end to a fairing or cowling, commonly referred to as the head or cap, against which the free end of the end part butts. Finally, the body of the adaptor generally has an actuating button that is engaged by clicking elastically into a hole or a notch of the end part, while this latter is butting against the head, in order to lock the adaptor in relation to the end part in this position.

An adaptor is used to combine a blade holder with a particular type of end part or arm. There are for example several varieties for the aforementioned U-section end parts. These varieties look very similar but differ from one another in the dimensions of same and in particular the width or lateral dimensions of same, the width of an end part being defined as the distance between the lateral legs of the end part and more specifically by the distance between the outer faces of said lateral legs. They also vary in the positions of the holes or notches designed to cooperate with the push buttons of the adaptor.

In the prior art, there are as many varieties of adaptors as there are varieties of end parts or extremities of drive arms, which is neither practical nor cost efficient. There are also different varieties of connectors, for example connectors that can be rigidly connected to at least one joint of the blade holder, or connectors that can be rigidly connected to an upper platform of the blade holder.

There is therefore a real need for "universal" elements for a connection system for a windscreen wiper blade holder with a drive arm, enabling assembly on different zones of the blade holder and at least two, or possibly more, end parts of the wiper arm.

The invention is intended to address these objectives.

DESCRIPTION OF THE INVENTION

The invention therefore relates to an element for a system for connecting a windscreen wiper blade holder to a drive arm, said element being designed to be rigidly attached to said blade holder or to said arm and having rotation means designed to cooperate with complementary means on another element of the connection system to form an axis of rotation between the element and the second element, said axis of rotation being intended to be the axis of rotation between said blade holder and said arm.

In the element according to the invention, said rotation means include a protuberance, which is arranged on one side of a longitudinal mid-plane of said element and is able to cooperate with a cavity in the other element, as well as a cavity, which is arranged on the other side of said plane and is able to cooperate with a protuberance on the other element, the element being asymmetrical in relation to said plane.

The longitudinal mid-plane is the longitudinal plane passing through the middle of the element, the middle being defined in relation to the two lateral ends of the element.

The element is asymmetrical, and the longitudinal mid-plane (which is perpendicular to the windscreen to be wiped when the windscreen wiper is in working position) is not the longitudinal plane of symmetry of the element. The protuberance and the cavity may therefore be asymmetrical in relation to said plane. Typically, the cavity is formed in the thickness of the element, while the protuberance projects from the element.

Thus, advantageously, the element according to the invention makes it possible to provide a connector and an adaptor that are able to cooperate with one another to form the system for connecting the windscreen wiper blade holder to the drive arm. The connector may be designed to be rigidly connected to at least one joint of the blade holder or to an upper platform of the blade holder, while the adaptor may be an adaptor for at least two different drive arms, such as for example at least one arm with a U-shaped end part or extremity, at least one rod arm, or at least one side-lock arm.

The protuberance is typically a substantially cylindrical physical shaft and said cavity is typically a seat matching the shape of said protuberance.

The protuberance may have a through-hole.

Said element may be a connector designed to be rigidly connected to the blade holder.

In this case, the element may include a base having a zone for rigid attachment to at least one joint of the blade holder.

The element (connector) may include a base provided with means for clipping to a platform of the blade holder.

The element (connector) may include a base surmounted by a flank, the cavity being formed in the flank and the protuberance coming out of the flank.

Said element may also be an adaptor designed to be rigidly connected to the drive arm.

The element (adaptor) may also have a U-shaped section formed by a base and two lateral flanks delimiting a seat, the protuberance coming out of a lateral flank and the cavity being formed in the other lateral flank.

The protuberance may extend into the seat.

The protuberance may include a shortened or bevelled portion.

The element (adaptor) may include an actuating button designed to be engaged by elastic click-fitting into a hole of an end part of the drive arm.

The element (adaptor) may be designed to be rigidly connected to a drive arm having an end part with a U-shaped section.

The element (adaptor) may be designed to be rigidly connected to a rod-arm drive arm.

The element (adaptor) may be designed to be rigidly connected to a side-lock drive arm.

The invention also relates to a system for connecting a windscreen wiper blade holder to a drive arm. The connection system according to the invention includes at least one element as described above.

The connection system may in particular include a connector as described above and an adaptor as described above.

The invention finally relates to a windscreen wiper blade holder or drive arm having or carrying an element as described above or a connection system as described above.

DESCRIPTION OF THE FIGURES

The invention can be better understood from, and other details, features and advantages of the invention are set out in, the description below, given by way of non-limiting example and with reference to the attached drawings, in which.

DETAILED DESCRIPTION

It should be noted that the figures show the invention in detail to enable the invention to be carried out, and these figures may be understood to better define the invention where appropriate.

In the description below, the terms longitudinal and lateral relate to the orientation of the windscreen wiper blade holder or of the drive arm according to the invention. The longitudinal direction corresponds to the main axis of the blade holder or of the arm along which it extends, while the lateral orientations correspond to the convergent straight lines, i.e. lines crossing the longitudinal direction, notably perpendicular to the longitudinal axis of the blade holder or of the arm in the plane of rotation of same. For the longitudinal directions, the terms outer (or rear) or inner (or front) shall be understood in relation to the point of attachment of the blade holder to the arm, the term inner corresponding to the portion where the arm and a half-blade holder extend, or in relation to the point of attachment of the arm to the vehicle. Finally, the directions referred to as upper and lower correspond to orientations perpendicular to the plane of rotation of the windscreen wiper blade holder, the term lower containing the plane of the windscreen.

Figure 1:
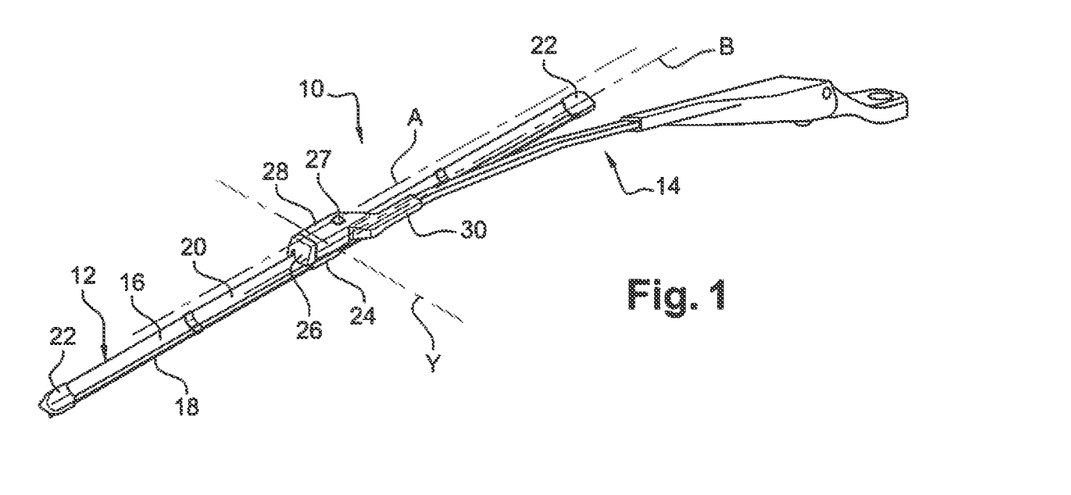
FIG. 1 is a schematic perspective view of a windscreen wiper, this windscreen wiper comprising a windscreen wiper blade holder and a drive arm for the blade holder that are connected together by a connection system.

FIG. 1 shows a windscreen wiper 10 comprising in particular a blade holder 12 and a drive arm 14 for the blade holder 12.

The blade holder 12 is preferably a flat blade and includes a longitudinal body 16, a wiper blade 18, usually made of rubber, and at least one joint (not shown) that stiffens the blade and facilitate the application of same to the windscreen of the vehicle.

The body 16 of the blade holder 12 may include an upper aerodynamic deflector 20 designed to improve operation of the wiping system, this deflector being intended to better press the blade holder against the windscreen, thereby improving the aerodynamic performance of the windscreen wiper.

The blade holder 12 may also include end caps 22 or clips for fastening the blade 18 and the joint to the body 16, each of these caps 22 being located at the longitudinal ends of the body 16.

The blade holder 12 has a connector 24, substantially at the middle of same, that is a first connection element between the arm 14 and the blade holder 12. An adaptor 26 rigidly connected to the arm 14 is mounted on the connector 24 in order to maintain a degree of freedom in rotation about an axis of articulation that is a transverse axis substantially perpendicular to the longitudinal axis of the blade holder 12. The adaptor 26 is a second connection element between the arm 14 and the blade holder 12. This degree of freedom enables the blade holder 12 to pivot in relation to the arm 14 and enables the blade holder to follow the curve of the windscreen when moving. The adaptor 26 may be disconnected from the arm 14 by pressing the actuating button, in this case a push button 27, carried on the adaptor 26.

The arm 14 is designed to be driven by a motor to follow an angular to-and-fro movement in order to remove water and any other unwanted elements covering the windscreen. The adaptor 26 links the blade holder 12 to the arm 14 and in particular to a head or end part 28 of the arm that may be formed as a single part with the arm or affixed to same.

In the example shown, the end part 28 of the arm forms a clevis with a substantially U-shaped cross section.

The end part 28 has an elongate shape in which the axis of elongation A is usually substantially parallel to the axis of elongation or longitudinal axis of the blade holder 12. The end part 28 includes a portion 30 for attachment to the rest of the arm 14, for example by crimping. This portion 30 has an overall elongate shape and extends along an axis B that is substantially parallel to the axis A and spaced apart from said axis, as shown in FIG. 1. The portion 30 is linked to an inner or rear end of the rest of the end part 28.

Figure 2:
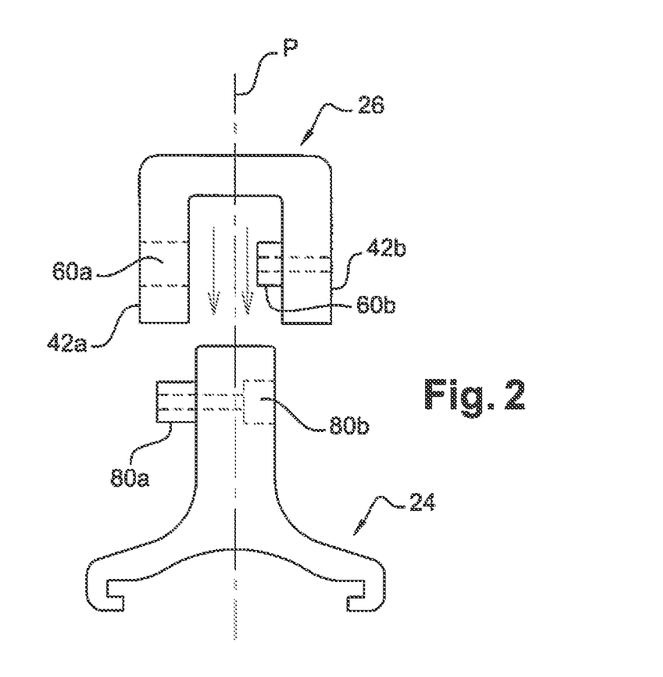
FIG. 2 is a schematic front view of a connector and of an adaptor according to the invention.

According to the invention, and as shown schematically in FIG. 2, the connector 24 includes a protuberance 80a on one side of the longitudinal mid-plane P, and a cavity 80b on the other side of the longitudinal mid-plane P. Similarly, the adaptor 26 includes a protuberance 60a on one side of a longitudinal mid-plane P, and a cavity 60b on the other side of the longitudinal mid-plane P.

The protuberance 80a on the connector 24 and the cavity 60a in the adaptor 26 are located on the same side. Similarly, the protuberance 80b on the adaptor 26 and the cavity 80b in the connector 24 are located on the same side. Consequently, the protuberance 80a on the connector 24 cooperates by elastic click-fitting with the cavity 60a in the adaptor 26, while the protuberance 60b on the adaptor 26 cooperates by elastic click-fitting with the cavity 80b in the connector 24, which enables the rigid connection of the connector 24 to the adaptor 26 and the formation of the axis of rotation of the blade holder to be achieved simultaneously.

The adaptor 26 is assembled on the connector 24 by a simple vertical translational movement, as shown by the arrows. During the translational movement, the lateral flanks 42a, 42b of the adaptor are forced to deform by moving away from one another. This operation continues until the protuberances 60b, 80a engage by click-fitting or elastic return in the cavities 80b, 60a. The adaptor 26 is then attached to the connector 24 and may also pivot on same about the axis of rotation Y (FIG. 3) by cooperation between the protuberances 60b, 80a and the cavities 80b, 60a. The cavities 80b, 60a have an internal diameter that is substantially equal to or slightly greater than the diameter of the protuberances 60b, 80a to enable rotation between the adaptor 26 and the connector 24.

Figure 3:
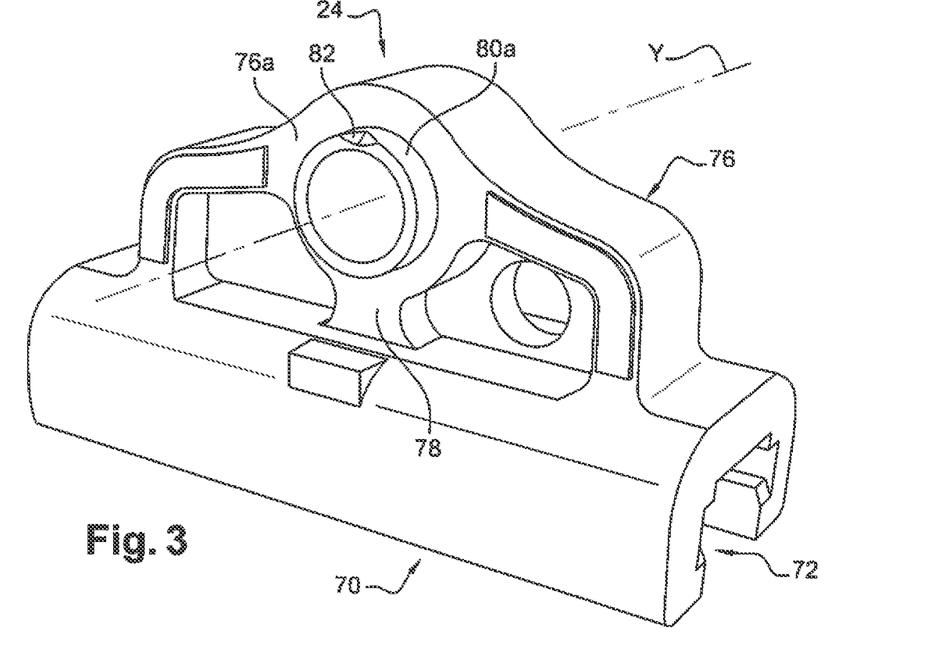
FIGS. 3 and 4 are perspective views of a connector according to the invention, according to a first embodiment.
Figure 4:
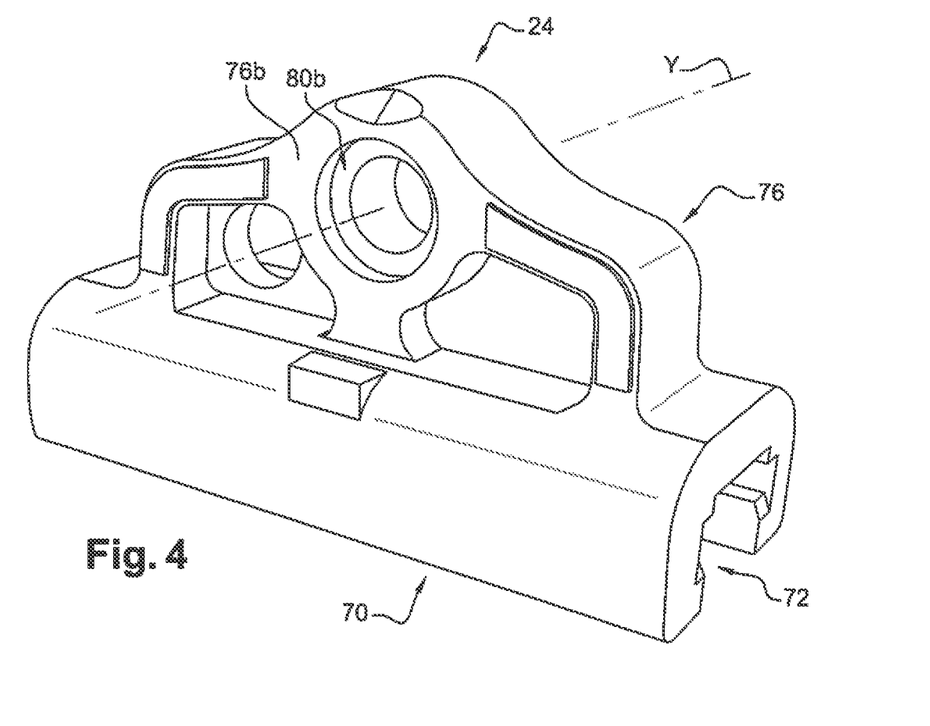

FIGS. 3 and 4 show a connector 24 according to the invention, according to a first embodiment. In this embodiment, the connector 24 is designed to be rigidly attached to the blade holder 12, for example by crimping. The connector 24 provides a full mechanical link with the blade holder 12, in the sense that it provides no degree of freedom. The connector 24 can also convey and distribute the windscreen washer fluid for the vehicle.

The connector 24 includes a base 70 that extends longitudinally and transversely. This base 70 includes a zone 72 for rigid attachment to the blade holder 12, and more specifically to at least one joint of this blade holder. This rigid attachment zone 72 is for example a groove formed in the base 70, this groove being edged by two hooks designed to engage the blade holder 12.

The blade holder 12 may include two parallel coplanar joints that are spaced apart from one another to form a space for seating the wiper blade 18 or the body 16 of the blade holder. Each joint has a longitudinal edge opposite the blade 18 that is seated in the groove of the connector 24.

The base 70 is surmounted by a flank 76, for example made from the material of the base. The transverse dimension of this flank 76 is less than the transverse dimension of the base, and the longitudinal dimension of same is substantially equal to the longitudinal dimension of the base. The flank 76 is for example centred on the base 70 about the axis of rotation Y. The flank 76 may have one or more ribs 78 to mechanically reinforce the flank.

The connector 24 and the adaptor 26 are linked mechanically by a pivot link. According to the invention, and with regard to the connector 24, this pivot link is implemented using firstly a protuberance 80a projecting from a lateral face 76a of the flank 76, and secondly a cavity 80b formed in the flank 76 of the connector, on the side of the other lateral face 76b of the flank 76. The protuberance 80a may include a recess to help guide the protuberance 80a into the cavity 60a of the adaptor 26.

The connector 24 described above is advantageously uniform, i.e. made from a single synthetic material. This connector may therefore be manufactured in a single moulding operation, in particular by injection.

Figure 5:
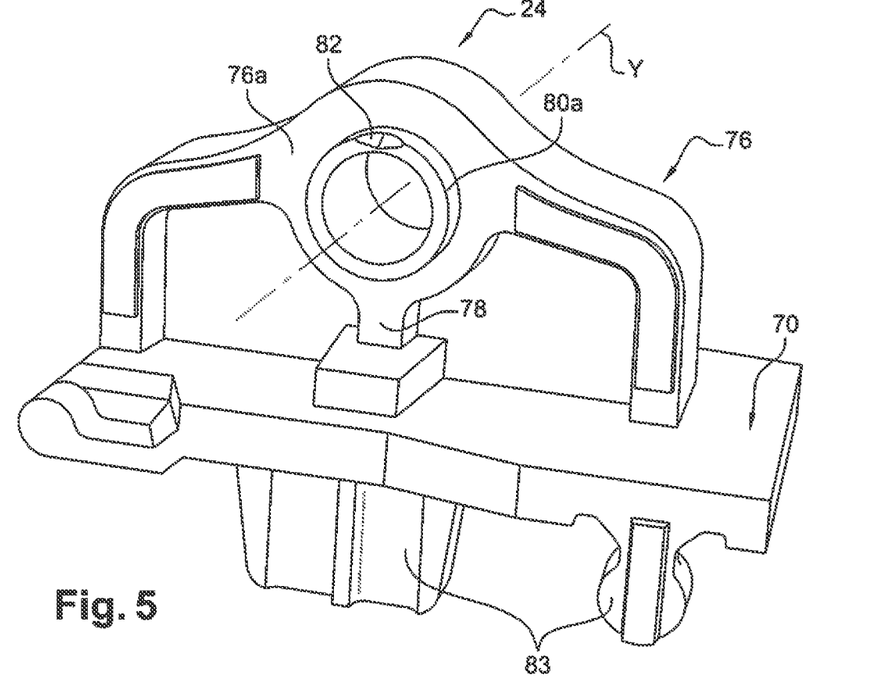
FIGS. 5 and 6 are perspective views of a connector according to the invention, according to a second embodiment.
Figure 6:
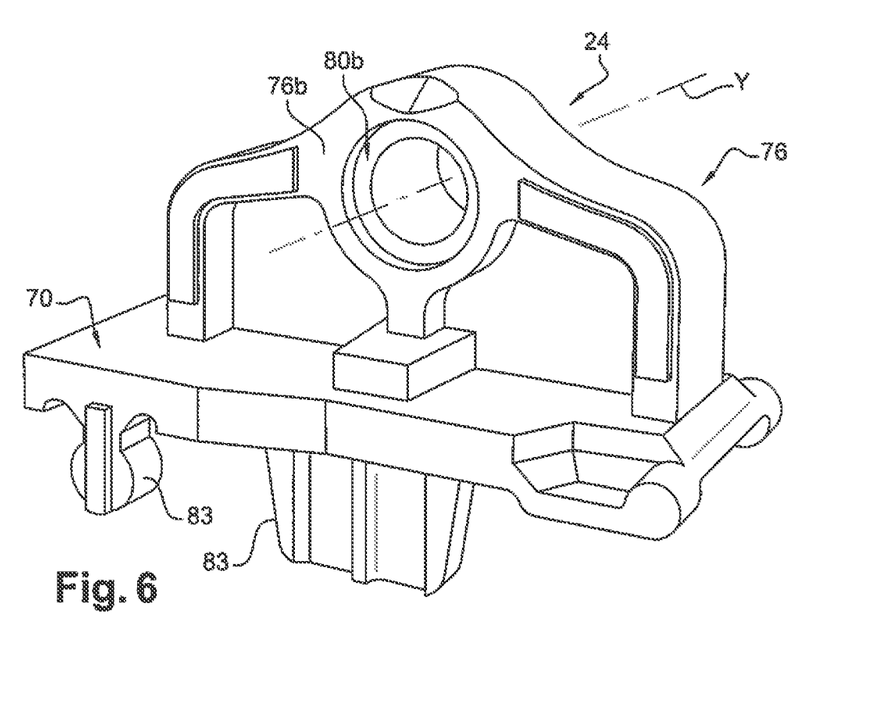

FIGS. 5 and 6 show a connector 24 according to the invention, according to a second embodiment. In this embodiment, in which the elements that are identical to the elements in FIGS. 4 and 5 are indicated using the same reference signs, the connector 24 is arranged to be rigidly clipped to the blade holder 12, for example to a platform of the blade holder 12.

Figures 7, 8:
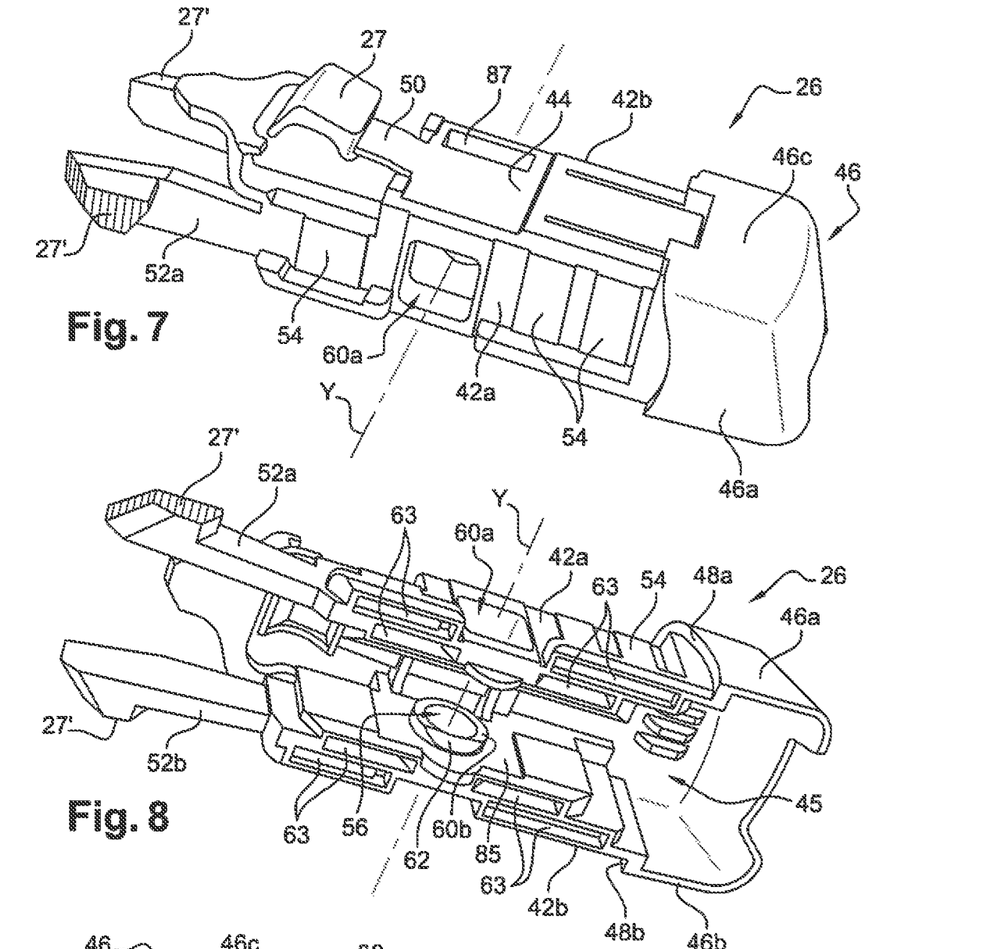
FIGS. 7 and 8 are perspective views of an adaptor according to the invention, according to a first embodiment.

FIGS. 7 and 8 show an adaptor according to the invention, according to a first embodiment.

The adaptor 24 has an overall elongate shape along the axis A (FIG. 1). The body of same has two lateral flanks 42a, 42b that are substantially parallel with one another and with the longitudinal axis A, and spaced apart from one another. These flanks 42a, 42b are linked together at the upper ends of same by an upper transverse wall 44 that is substantially perpendicular to the flanks 42a, 42b. In this case, the flanks 42a, 42b, 44 have an elongate shape in the longitudinal direction.

The flanks 42a, 42b, 44 of the adaptor 26 together define a longitudinal space 45, also referred to as a seat, in which a portion of the connector 24 is intended to be assembled. The flanks advantageously include at least one cavity 63 to lighten the material and to improve the moulding of the adaptor 26.

The body of the adaptor 26 is linked at a first of the longitudinal ends of same to a fairing or cowling 46, also referred to as the head or cap. The lateral dimension of this head 46 is greater than the dimension of the body of the adaptor and the height of same is also greater than the height of the body. The lateral flanks 42a, 42b of the body of the adaptor are thus set back or offset in relation to the outer lateral faces 46a, 46b of the head, and the upper wall 44 of same is set back or offset in relation to the outer upper face 46c of the head.

The lateral faces 46a, 46b of the head 46 are linked to the lateral flanks 42a, 42b of the body by the lateral rear faces 48a, 48b respectively, which extend substantially perpendicular to the longitudinal axis A. The upper face 46c of the head 46 is linked to the upper wall 44 of the body by another upper rear face that also extends substantially perpendicular to the longitudinal axis A.

The rear faces 48a, 48b of the head 46 form the bearing faces of the front or outer end of the end part 28. More specifically, when the adaptor is assembled in the end part 28, the free front edges of the lateral legs of the end part are intended to bear against the faces 48a, and the free front edge of the transverse wall of the end part is intended to bear against the face 48b.

The upper wall 44 has a longitudinal tab 50 at the longitudinal end of same opposite the head 46.

The tab 50 extends longitudinally from the side opposite the head 46 as an extension of the upper wall 44. The tab is elastically deformable and linked via the front or outer free end of same to an upper push button 27, which projects from the tab 50. In a free unstressed state, the tab 50 is such that the push button 27 is located above a plane passing through the upper wall 44. The elastic deformations of the tab 50 in this case take place in a substantially vertical longitudinal mid-plane, i.e. substantially perpendicular to the upper wall 44. The adaptor 26 is therefore fitted with an upper push button 27.

During assembly of the adaptor 26 in the end part 28, the push button 27 is intended to engage by elastic click-fitting into an opening in the end part 28 to lock the adaptor in relation to the end part 28.

The lateral flanks 42a, 42b of the body extend towards the inside via longitudinal feet 52a, 52b that are elastically deformable. Each flank 42a, 42b is linked to a foot 52a, 52b, these feet 52a, 52b being substantially parallel to and symmetrical with a longitudinal mid-plane that is substantially vertical, i.e. perpendicular to the upper wall 44 of the adaptor. Each of the free ends of the feet 52a, 52b, which are located on the side opposite the head 46, has a projecting lateral push button 27'. Each foot 52a, 52b therefore has a push button 27". The elastic deformations of the feet 52a, 52b in this case occur in a substantially horizontal longitudinal plane, i.e. substantially parallel to the upper wall 44. The elastic deformation may bring the feet 52a, 52b closer together. The push buttons 27" are designed to cooperate with notches in the end part 28.

The lateral flanks 42a, 42b of the body of the adaptor 26 include ribs 54 on the outer faces of same that are substantially parallel with one another, parallel to the longitudinal axis A and spaced apart from one another. The top of each rib 54 forms a flat surface intended to cooperate with the end part 28 of the arm. In this case, these ribs 54 correspond to the thickest portions of the lateral flanks 42a, 42b.

Each lateral flank 42a, 42b has a through-hole 56. The holes in the flanks 42a, 42b are substantially coaxial and in this case define the axis of rotation Y of the adaptor 24 on the connector 24, and therefore between the blade holder and the arm. In this case, the holes have a circular section and each have a substantially cylindrical inner surface. The orifices open out at the outer lateral ends of same onto the outer faces of the flanks 42a, 42b, respectively, and at the inner lateral ends of same into the seat 45. The adaptor 26 is provided with a cavity 60a that is the through-hole of the flank 42a.

An inner lateral face 85 facing the lateral flank 42b includes a protuberance 60b. The protuberance 60b extends into the seat 45. The protuberance 60b has a plane of symmetry that passes through the axis of rotation Y and that is perpendicular to the longitudinal axis A.

The protuberance 60b is perforated and includes a through-hole. This hole is in this case formed by one of the aforementioned holes. The protuberance 60b is therefore located on the inner face 85 of the lateral flank 42b such that the hole in said flank passes through said protuberance.

The protuberance 60b has an overall cylindrical shape and is in this case tubular on account of the hole passing through same. The axis of each hole, which is the same as the axis of rotation Y, is also the same as the axis of the protuberance 60b, such that the hole is centred in relation to the protuberance. The protuberance 60b thus forms an annular bead of material about the hole with a radial thickness in relation to the axis of rotation Y that is substantially constant. The protuberance 60b has an axial dimension along the axis of rotation Y that represents preferably approximately 10-20% of the axial dimension or width of the seat along the axis of rotation Y. The protuberance 60b has an external diameter that preferably represents approximately 60-80% of the height of the lateral flank 42b, measured in a substantially vertical direction perpendicular to the upper wall 44.

As shown in FIG. 8, the protuberance 60b includes a portion, in this case a lower portion, that is shortened or bevelled. The shortened or bevelled portion forms a ramp 62 that extends in a plane inclined in relation to the lateral flank 42b. The ramp 62 forms a sliding surface intended to cooperate with the connector 24. The ramp 62 of the protuberance 60b is inclined such as to move downwards away from the mid-plane of the adaptor 26. The lower end of the ramp 62 extends a short distance along the axis of rotation Y from the inner face 85 of the lateral flank 42b and may be directly connected to this inner face.

The adaptor 26 described above is advantageously uniform, i.e. made from a single synthetic material. The adaptor may therefore be manufactured in a single moulding operation, in particular by injection.

As explained above, the adaptor 26 is attached to the connector 24 using the protuberances 80a, 60b and the cavities 60a, 80b that form the attachment means between the adaptor and the connector and that may also form the pivoting or rotational means between the adaptor and the connector. The attachment means are elastic click-fitting means.

The adaptor 26 according to this first embodiment is designed to be rigidly attached to a side-lock arm. The adaptor is indeed designed to receive an end part comprising a cylindrical rod extending transversely on one side of the end part, as well as a lock. The rod is intended to pass through the holes in the adaptor and the cavity in the connector. The lock includes a hook that can be seated in a hole 87 in the adaptor 26.

The adaptor 26 according to the invention is a universal adaptor and is designed to be assembled both on end parts 28 of different arms, or on arms not fitted with end parts.

Figure 9:
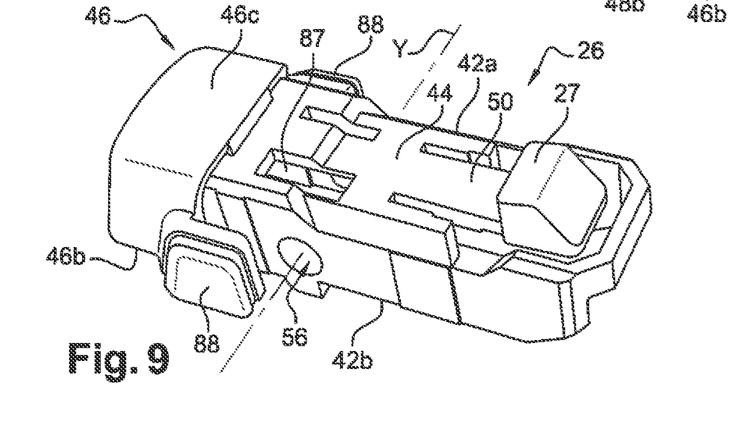
FIGS. 9 and 10 are perspective views of an adaptor according to the invention, according to a second embodiment.
Figure 10:
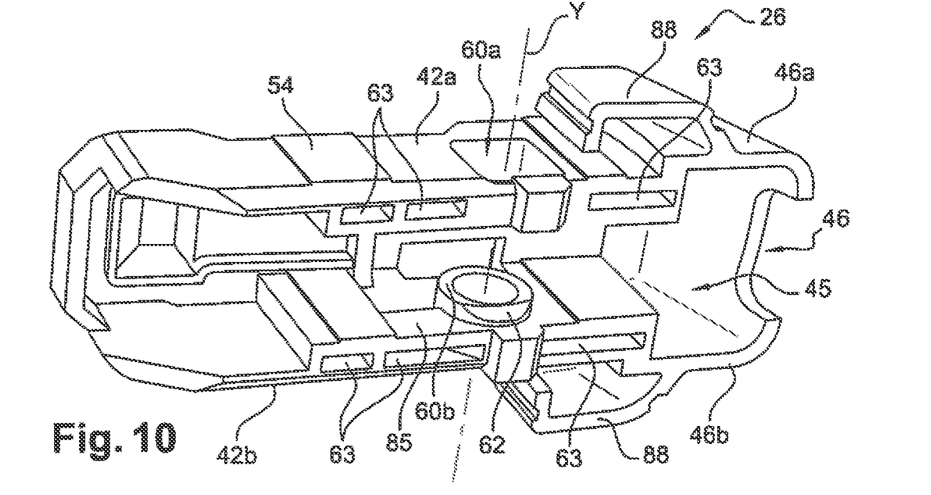

Thus, in a second embodiment, as shown in FIGS. 9 and 10, in which identical elements are indicated using the same reference signs, the adaptor 26 is designed to receive an end part 28 in the form of a clevis with a U-shaped cross section. The adaptor 26 is also designed to be assembled on a blade holder with a side-lock arm, in particular using the through-hole 56, on the hole 87 and on the lateral play-compensation lugs 88.

Figure 11:
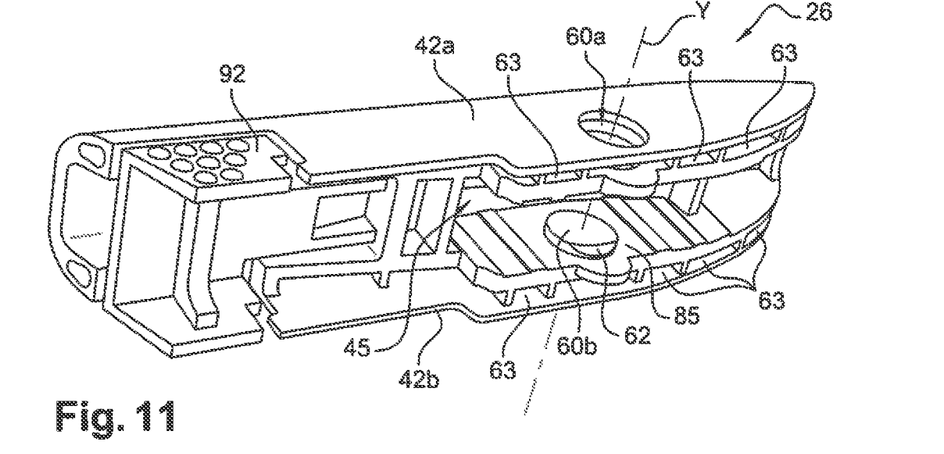
FIGS. 11 and 12 are perspective views of an adaptor according to the invention, according to a third embodiment.
Figure 12:
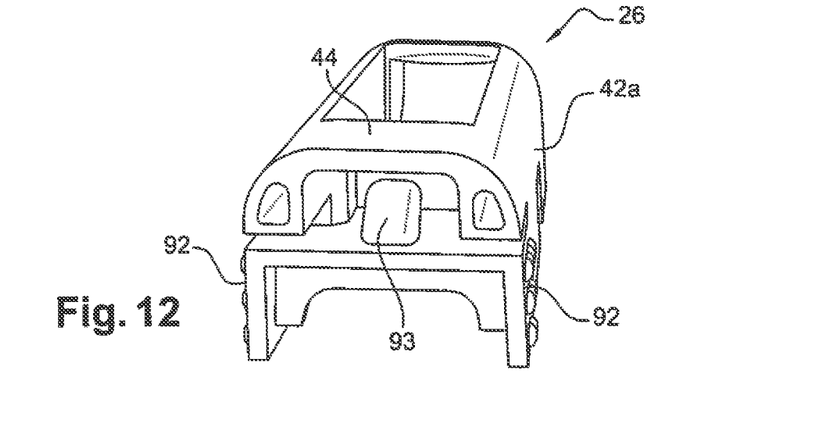

In a third embodiment, the adaptor 26 is designed to be assembled on a rod-arm arm. The rod arm may be assembled and disassembled from the adaptor 26 using the push buttons 92 and the click pad 93 (FIGS. 11 and 12).

Figure 13:
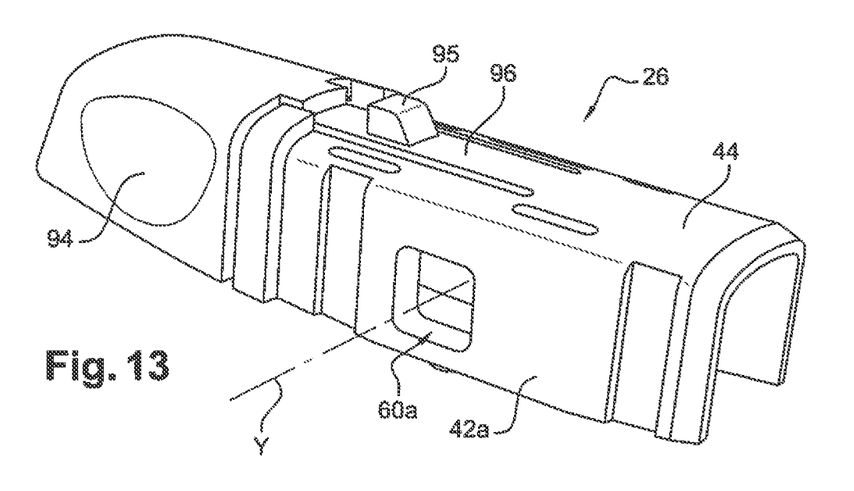
FIGS. 13 and 14 are perspective views of an adaptor according to the invention, according to a fourth embodiment.
Figure 14:
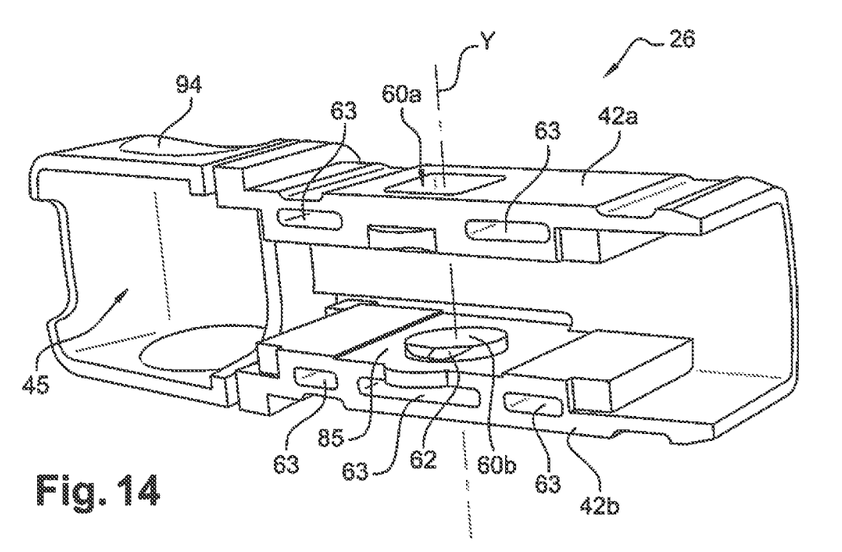

In a fourth embodiment, the adaptor 26 is designed to receive an end part 28 in the form of a clevis with a U-shaped cross section. For this purpose, it has an actuating button 95 arranged on a tab 50 that is engaged by elastic click-fitting in a hole or a notch of the end part 28 using push buttons 94 (FIGS. 13 and 14).

The invention claimed is:

1. A first element for a system for connecting a windscreen wiper blade holder to a drive arm, said first element being rigidly connected to said blade holder or to said drive arm and comprising:
   rotation means configured to cooperate with complementary means of a second element of the connection system to form a transverse axis of rotation between the first element and the second element,
   wherein said transverse axis of rotation is an axis of rotation between said blade holder and said arm,
   wherein the rotation means includes a first protuberance, which is arranged on one side of a longitudinal mid-plane of said first element and is able to cooperate with a first cavity in the second element, and a second cavity, which is arranged on another side of said longitudinal mid-plane of the first element and cooperates with a second protuberance on the second element, the second element being asymmetrical in relation to said longitudinal mid-plane, wherein the first element comprises a base surmounted by a flank and extending longitudinally and transversely, wherein the first element and the second element are pivotally linked using both the first protuberance projecting from a lateral face of the flank, and the second cavity formed in the flank of the first element, on a side of another lateral face of the flank, wherein the first protuberance includes a shortened or bevelled portion which forms a ramp with a sliding surface configured to cooperate with the first element, wherein a surface of the ramp is inclined such that a top of the ramp, which is closer to a centre of the first protuberance than a bottom of the ramp, is inclined downwards away from the longitudinal mid-plane of the first element toward an outer edge of the first protuberance, and wherein the first protuberance, the second protuberance, the first cavity, and the second cavity are all aligned along the transverse axis of rotation.

2. The first element according to claim 1, wherein the first protuberance and the first cavity are asymmetrical in relation to said the longitudinal mid-plane.

3. The first element according to claim 1, wherein the first protuberance is a substantially cylindrical physical shaft and the first cavity is a seat matching a shape of said first protuberance.

4. The first element according to claim 1, wherein the first protuberance has a through-hole.

5. The first element according to claim 1, wherein said first element is a connector designed to be rigidly connected to the blade holder.

6. The first element according to claim 5, further comprising the base having a zone for rigid attachment to at least one joint of the blade holder.

7. The first element according to claim 5, further comprising the base provided with means for clipping to a platform of the blade holder.

8. The first element according to claim 1, wherein said second element is an adaptor designed to be rigidly connected to the drive arm.

9. The first element according to claim 8, wherein the second element comprises a U-shaped section formed by a base and two lateral flanks delimiting a seat, the first protuberance coming out of a lateral flank and the first cavity being formed in another lateral flank.

10. The first element according to claim 9, wherein the first protuberance extends into the seat.

11. The first element according to claim 8, further comprising an actuating button configured to be engaged by elastic click-fitting into a hole of an end part of the drive arm.

12. The first element according to claim 8, wherein the first element is rigidly connected to a drive arm having an end part with a U-shaped section.

13. The first element according to claim 8, wherein the first element is rigidly connected to a rod-arm drive arm.

14. The first element according to claim 8, wherein the first element is rigidly connected to a side-lock drive arm.

15. A connection system for a windscreen wiper blade holder with a drive arm, the system comprising at least one element according to claim 1.

16. The connection system according to claim 15, further comprising a first of the at least one element configured to be a connector rigidly connected to the blade holder; and a second of the at least one element configured to be an adaptor rigidly connected to the drive arm.

17. A windscreen wiper blade holder or drive arm comprising and carrying a connection system according to claim 15.

18. A windscreen wiper blade holder or drive arm, comprising and carrying the first element according to claim 1.

* * * * *